(12) United States Patent
Chiang

(10) Patent No.: US 6,699,108 B1
(45) Date of Patent: Mar. 2, 2004

(54) ROTARY WOODWORKING MACHINE HAVING A DUST COLLECTING MECHANISM FOR A PLURALITY OF WOODWORKING MEMBERS

(76) Inventor: Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 2 days.

(21) Appl. No.: 10/391,965

(22) Filed: Mar. 19, 2003

(30) Foreign Application Priority Data

Dec. 26, 2002 (TW) ...................................... 91221214 U

(51) Int. Cl.$^7$ ........................... B24C 9/00; B24B 55/06; B27G 19/00
(52) U.S. Cl. ...................... 451/87; 144/252.1; 409/137; 451/453; 451/456
(58) Field of Search ...................... 144/1.1, 3.1, 252.1, 144/252.2; 409/131, 137, 140; 451/65, 87, 88, 453, 456

(56) References Cited

U.S. PATENT DOCUMENTS

| | | | | | |
|---|---|---|---|---|---|
| 3,760,538 | A | * | 9/1973 | Solheim | ..................... 451/456 |
| 4,221,081 | A | * | 9/1980 | Everett | ................... 451/453 X |
| 6,481,475 | B1 | * | 11/2002 | Liao et al. | ............... 144/252.1 |
| 6,601,621 | B2 | * | 8/2003 | Wixey et al. | ............ 144/252.1 |
| 2003/0002945 | A1 | * | 1/2003 | Sunaga et al. | .............. 409/140 |

* cited by examiner

Primary Examiner—W. Donald Bray
(74) Attorney, Agent, or Firm—Christie, Parker & Hale, LLP

(57) ABSTRACT

A rotary woodworking machine includes first, second and third rotary woodworking members, and a dust collecting mechanism. The dust collecting mechanism includes first, second, and third dust collecting units for collecting wood dust generated during a woodworking operation of the first, second and third rotary woodworking members, respectively, a dust accommodating unit for receiving the wood dust from the first, second and third dust collecting units, and a blower mechanism which is connected to and which is in fluid communication with the dust accommodating unit and which is operable so as to draw the wood dust in the dust accommodating unit out of the rotary woodworking machine.

6 Claims, 9 Drawing Sheets

ROTARY WOODWORKING MACHINE HAVING A DUST COLLECTING MECHANISM FOR A PLURALITY OF WOODWORKING MEMBERS

CROSS-REFERENCE TO RELATED APPLICATION

This application claims priority of Taiwanese application no. 091221214, filed on Dec. 26, 2002.

BACKGROUND OF THE INVENTION

1. Field of the Invention

The invention relates to a rotary woodworking machine, more particularly to a rotary woodworking machine having a dust collecting mechanism for a plurality of woodworking members.

2. Description of the Related Art

A rotary woodworking machine that comprises three types of rotary woodworking members, such as an emery wheel, a sanding drum, and a sanding belt device, is known in the art.

While the conventional rotary woodworking machine achieves the purpose of providing different types of rotary woodworking members to suit different woodworking requirements, however, wood dust generated from woodworking operations of the rotary woodworking members of the conventional rotary woodworking machine scatters in all directions, which results in a messy work place and poses danger to the health of operators.

SUMMARY OF THE INVENTION

Therefore, the object of the present invention is to provide a rotary woodworking machine that has a dust collecting mechanism for a plurality of woodworking members so as to overcome the aforesaid drawbacks of the prior art.

According to the present invention, a rotary woodworking machine comprises a base frame which has first and second lateral sides and a top side, a first rotary woodworking member which is disposed adjacent to the first lateral side of the base frame, a second rotary woodworking member which is disposed above the top side of the base frame, a third rotary woodworking member which is disposed adjacent to the second lateral side of the base frame, a motor assembly which is mounted in the base frame and which is coupled to and which drives rotatably the first, second and third rotary woodworking members, and a dust collecting mechanism. The dust collecting mechanism includes a first dust collecting unit, an air conduit, a second dust collecting unit, a third dust collecting unit, a dust accommodating unit, a blower casing, and a blower impeller. The first dust collecting unit is used to collect wood dust generated during a woodworking operation of the first rotary woodworking member, and confines a first dust guideway.

The first dust guideway has an inlet port which is disposed in the vicinity of the first rotary woodworking member. The first dust guideway is formed with an air duct therein. The air duct has a first opening which is disposed downstream of the inlet port of the first dust guideway and which is in spatial communication therewith. The air duct further has a second opening which is disposed downstream of the first opening. The air conduit confines a flow channel which is connected to and which is in fluid communication with the second opening. The second dust collecting unit is used to collect wood dust generated during a woodworking operation of the second rotary woodworking member, and confines a second dust guideway. The second dust guideway has an inlet port which is disposed in the vicinity of the second rotary woodworking member, and an outlet port which is disposed downstream of the inlet port of the second dust guideway and which is connected to and which is in fluid communication with the air conduit. The third dust collecting unit is used to collect wood dust generated during a woodworking operation of the third rotary woodworking member, and confines a third dust guideway. The third dust guideway has an inlet port which is disposed in the vicinity of the third rotary woodworking member, and an outlet port which is disposed downstream of the inlet port of the third dust guideway. The dust accommodating unit receives the wood dust from the first, second and third dust guideways, and is formed with a partition wall to partition the dust accommodating unit into first and second accommodation chambers. The partition wall is formed with a communicating hole to permit fluid communication between the first and second accommodation chambers. The first accommodation chamber as a first entrance port which is connected to and which is in fluid communication with the outlet port of the third dust guideway. The second accommodation chamber has a second entrance port which is connected to and which is in fluid communication with the flow channel of the air conduit. The second accommodation chamber further has an exit port. The blower casing confines an impeller accommodating space and is formed with a first port which is connected to and which is in fluid communication with the exit port, and a second port. The blower impeller is disposed in the impeller accommodating space and is operable so as to draw the wood dust in the second accommodation chamber of the dust accommodating unit into the impeller accommodating space through the first port and out of the second port.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
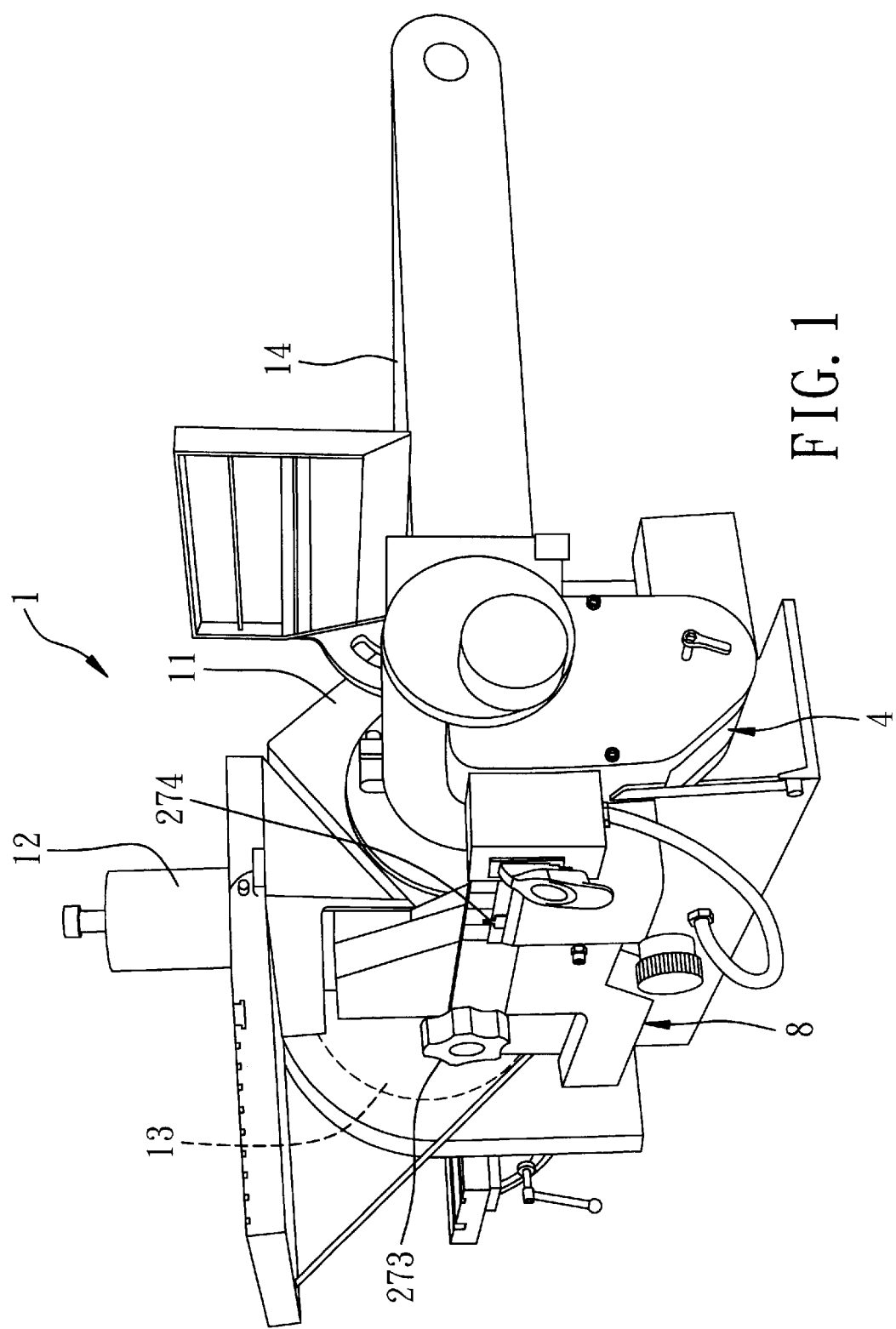
FIG. 1 is a perspective view of the preferred embodiment of a rotary woodworking machine according to the present invention.
Figure 2:
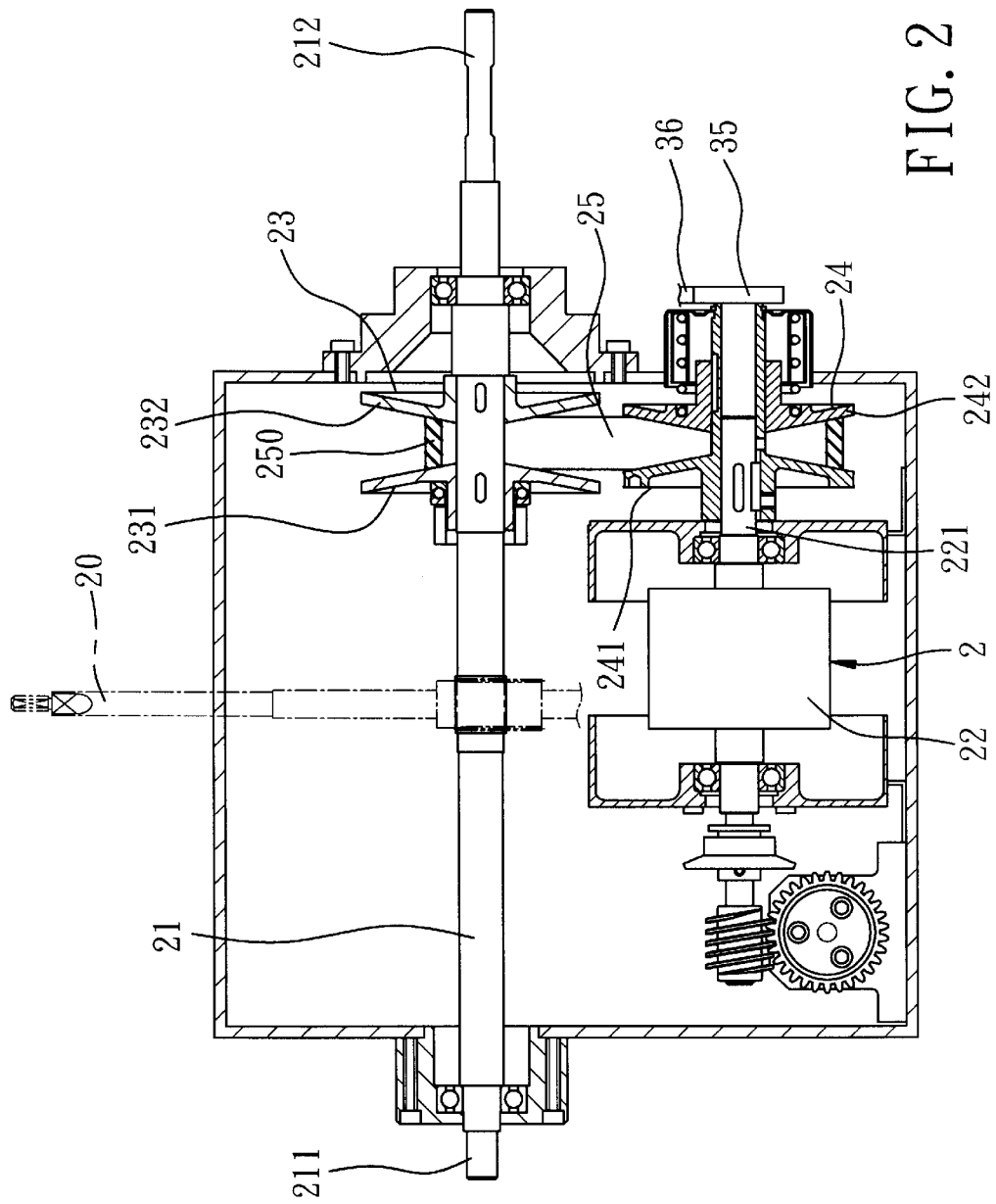
FIG. 2 is a schematic view to illustrate a motor assembly of the preferred embodiment.

Referring to FIGS. 1 and 2, the preferred embodiment of a rotary woodworking machine 1 according to the present invention is shown to include a base frame 11, a first rotary woodworking member 13, a second rotary woodworking member 12, a third rotary woodworking member 14, a dust collecting mechanism, and a motor assembly 2.

The base frame 11 has first and second lateral sides and a top side. The first rotary woodworking member 13 is disposed adjacent to the first lateral side of the base frame 11. The second rotary woodworking member 12 is disposed above the top side of the base frame 11. The third rotary woodworking member 14 is disposed adjacent to the second lateral side of the base frame 11. In this embodiment, the first rotary woodworking member 13 includes an emery wheel, the second rotary woodworking member 12 includes a sanding drum, and the third rotary woodworking member 14 includes a sanding belt device.

With further reference to FIGS. 3 to 7, the dust collecting mechanism includes a first dust collecting unit 7, an air conduit 8, a second dust collecting unit 5, a third dust collecting unit 6, a dust accommodating unit 4, and a blower mechanism constituted by a blower casing 31 and a blower impeller 33.

The first dust collecting unit 7 is used to collect wood dust generated during a woodworking operation of the first woodworking member 13, is formed on the first lateral side of the base frame 11, and confines a first dust guideway 73. The first dust guideway 73 has an inlet port 74 which is disposed in the vicinity of the first rotary woodworking member 13. In this embodiment, the first rotary woodworking member 13 has a lower portion that extends into the first dust guideway 73 through the inlet port 74. The first dust guideway 73 is formed with an air duct 72 therein. The air duct 72 has a first opening 721 which is disposed downstream of the inlet port 74 of the first dust guideway 73 and which is in spatial communication therewith. The air duct 72 further has a second opening 722 which is disposed downstream of the first opening 721.

The air conduit 8, which is formed on one side of the base frame 11 between the first and second lateral sides, confines a flow channel which is connected to and which is in fluid communication with the second opening 722. The preferred configuration of the flow channel will be described in greater detail in the succeeding paragraphs.

The second dust collecting unit 5 is used to collect wood dust generated during a woodworking operation of the second rotary woodworking member 12, is formed on the top side of the base frame 11, and confines a second dust guideway 53. The second dust guideway 53 has an inlet port 511 which is disposed in the vicinity of the second rotary woodworking member 12, and an outlet port 512 which is disposed downstream of the inlet port 511 of the second dust guideway 53 and which is connected to and which is in fluid communication with the flow channel of the air conduit 8. In this embodiment, the second rotary woodworking member 12 is disposed above the inlet port 511 of the second dust guideway 53.

The rotary woodworking machine 1 further comprises an impeller 52 that is secured to the second rotary woodworking member 12 and that is operable so as to draw the wood dust generated during the woodworking operation of the second rotary woodworking member 12 into the inlet port 511 of the second dust guideway 53.

Figure 9:
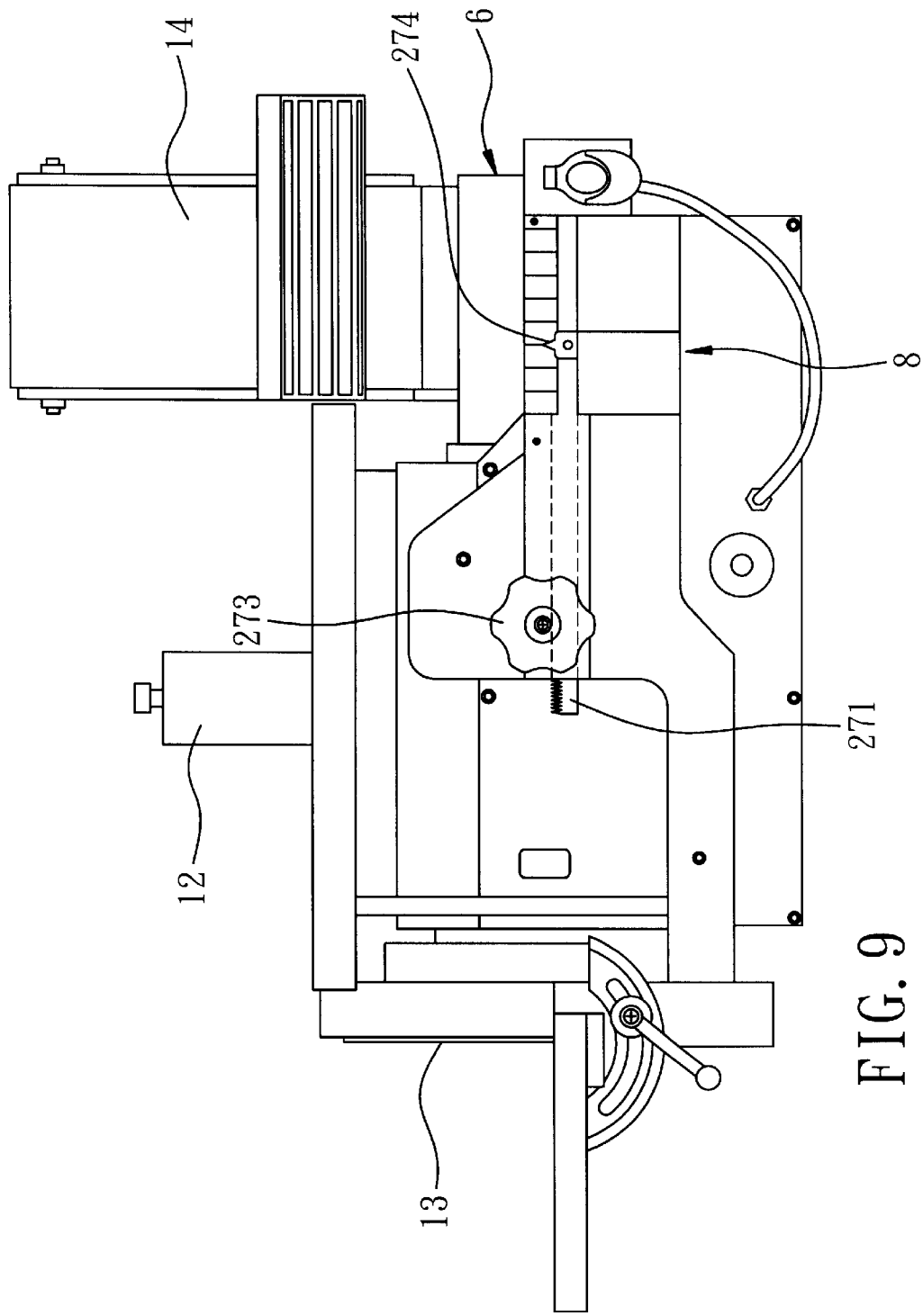
FIG. 9 is a schematic view to illustrate positional relationships among the first, second and third rotary woodworking members, and a speed indicator of the motor assembly.

The third dust collecting unit 6 is used to collect wood dust generated during a woodworking operation of the third rotary woodworking member 14, is disposed at the second lateral side of the base frame 11, and confines a third dust guideway 61. The third dust guideway 61 has an inlet port 611 which is disposed in the vicinity of the third rotary woodworking member 14, and an outlet port 612 which is disposed downstream of the inlet port 611 of the third dust guideway 61. In this embodiment, one end of the third rotary woodworking member 14 extends into the third dust guideway 61 through the inlet port 611. Preferably, the third dust collecting unit 6 is pivotable together with the third rotary woodworking member 14 relative to the base frame 11 between horizontal and vertical positions, as best shown in FIGS. 1 and 9.

The dust accommodating unit 4 receives the wood dust from the first, second and third dust guideways 73, 53, 61, and is formed with a partition wall 420 to partition the dust accommodating unit 4 into first and second accommodation chambers 421, 411. The partition wall 420 is formed with a pair of fan-shaped communicating holes 422 to permit fluid communication between the first and second accommodation chambers 421, 411. The first accommodation chamber 421 has a first entrance port 423 which is connected to and which is in fluid communication with the outlet port 612 of the third dust guideway 61. The second accommodation chamber 411 has a second entrance port 414 which is connected to and which is in fluid communication with the flow channel of the air conduit 8. The second accommodation chamber 411 further has an exit port 412.

The flow channel of the air conduit 8 includes a first passageway 82 which has a first open port 85 connected to and in fluid communication with the second opening 722 of the air duct 72 in the first dust guideway 73, a second passageway 81 which has a second open port 84 connected to and in fluid communication with the outlet port 512 of the second dust guideway 53, and a third passageway 83 which is connected to and which is in fluid communication with the first and second passageways 82, 81, and which has a third open port 86 connected to and in fluid communication with the second entrance port 414 of the second accommodation chamber 411.

The blower casing 31 confines an impeller accommodating space, and is formed with a first port 313 which is connected to and which is in fluid communication with the exit port 412, and a second port 314.

The blower impeller 33 is disposed in the impeller accommodating space and is operable so as to draw the wood dust in the second accommodation chamber 411 of the dust accommodating unit 4 into the impeller accommodating space through the first port 313 and out of the second port 314.

The dust accommodating unit 4 further includes a mounting wall 42, a crank 44, and a valve 43. The mounting wall 42 cooperates with the partition wall 420 to confine the first accommodation chamber 421. The crank 44 extends rotatably through the mounting wall 42, and has an inner end which is disposed in the first accommodation chamber 421, and an outer end which is disposed externally of the first accommodation chamber 421. The valve 43 is mounted on and rotates with the inner end of the crank 44. The valve 43 is configured so as to cover and uncover the communicating holes 422 by an extent corresponding to rotary displacement of the crank 44.

As best shown in FIG. 2, the motor assembly 2 is mounted in the base frame 11, and is coupled to and drives rotatably the first, second and third rotary woodworking members 13, 12, 14. The motor assembly 2 includes a motor 22 with an output shaft 221, a transmission shaft 21, first belt transmission means 25, an upright shaft 20, and second belt transmission means 36. The transmission shaft 21 is parallel to the output shaft 221, and has opposite ends 211, 212 that are coupled respectively to the first and third rotary woodworking members 13, 14 (see FIG. 1). The first belt transmission means 25 serves to transmit rotation of the output shaft 221 to the transmission shaft 21. The upright shaft 20 has a lower end that is coupled to the transmission shaft 21 so as to be driven rotatably thereby, and an upper end that is coupled to the second rotary woodworking member 12 (see FIG. 1). The second belt transmission means 36 serves to transmit rotation of the output shaft 221 to the blower impeller 33 (see FIG. 3).

Figure 3:
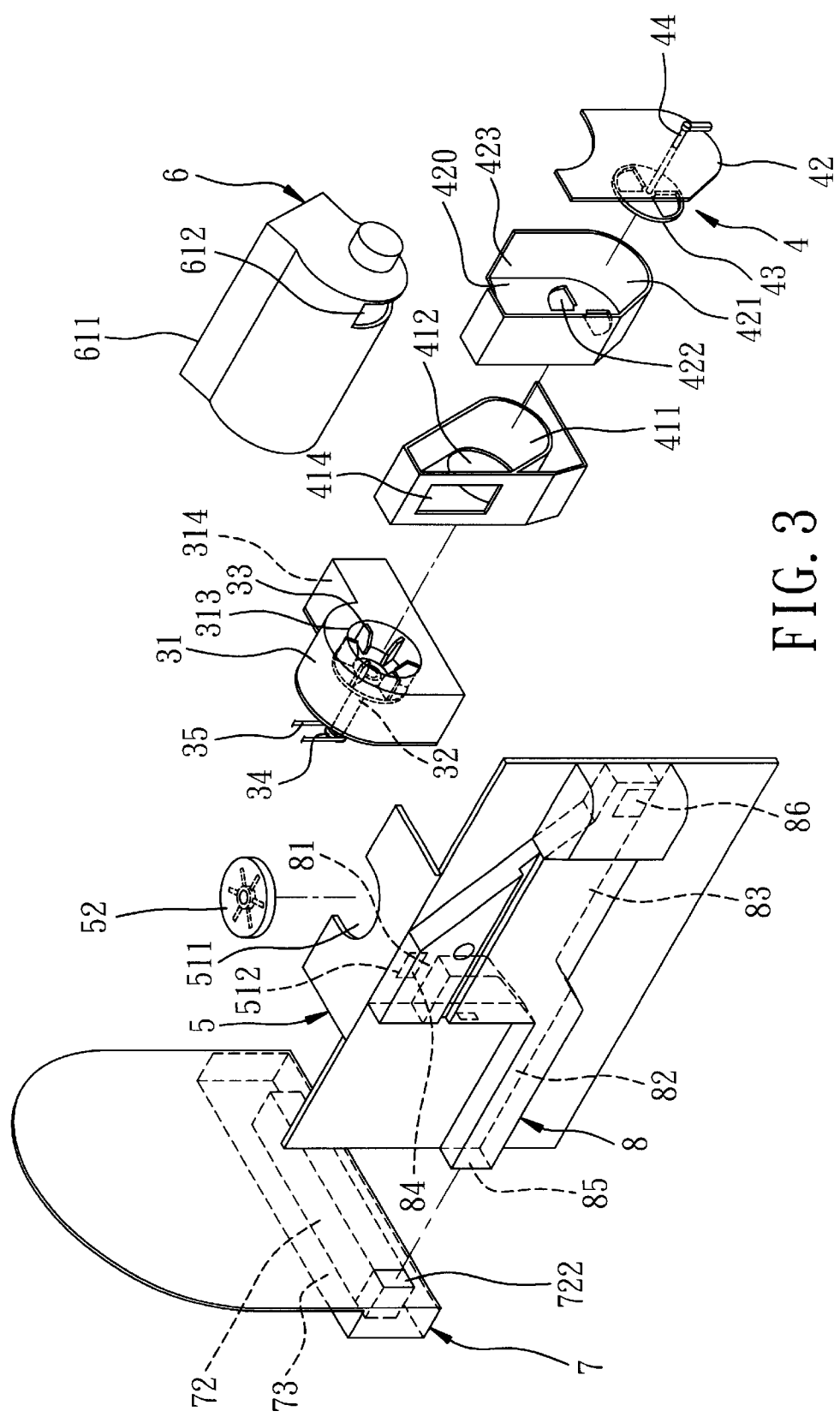
FIG. 3 is an exploded perspective view to illustrate a dust collecting mechanism of the preferred embodiment.

As best shown in FIGS. 2 and 3, an impeller shaft 32 extends rotatably through the blower casing 31, and has inner and outer ends that are respectively disposed internally and externally of the impeller accommodating space. The second belt transmission means 36 includes a drive pulley (not visible in FIG. 2) that is mounted to rotate with the output shaft 221, and a driven pulley 34 that is sleeved on and that rotates with the outer end of the impeller shaft 32. A transmission belt 35 is trained on the drive pulley and the driven pulley 34. The blower impeller 33 includes a connecting plate which is secured on the inner end of the impeller shaft 32 by a screw so as to be driven by the inner end of, the impeller shaft 32 to rotate a plurality of fins on the connecting plate.

The first belt transmission means 25 includes first and second pulleys 23, 24. The first and second pulleys 23, 24 are mounted respectively on the transmission and output shafts 21, 221. A transmission belt 250 is trained on the first and second pulleys 23, 24. Each of the first and second pulleys 23, 24 includes a fixed disc 232, 242, and a movable disc 231, 241. Each of the movable discs 231, 241 is movable toward and away from the respective fixed disc 232, 242. As such, the speed ratio of the transmission shaft 21 to the output shaft 221 can be varied so as to change the rotational speed of the transmission shaft 21.

Figure 8:
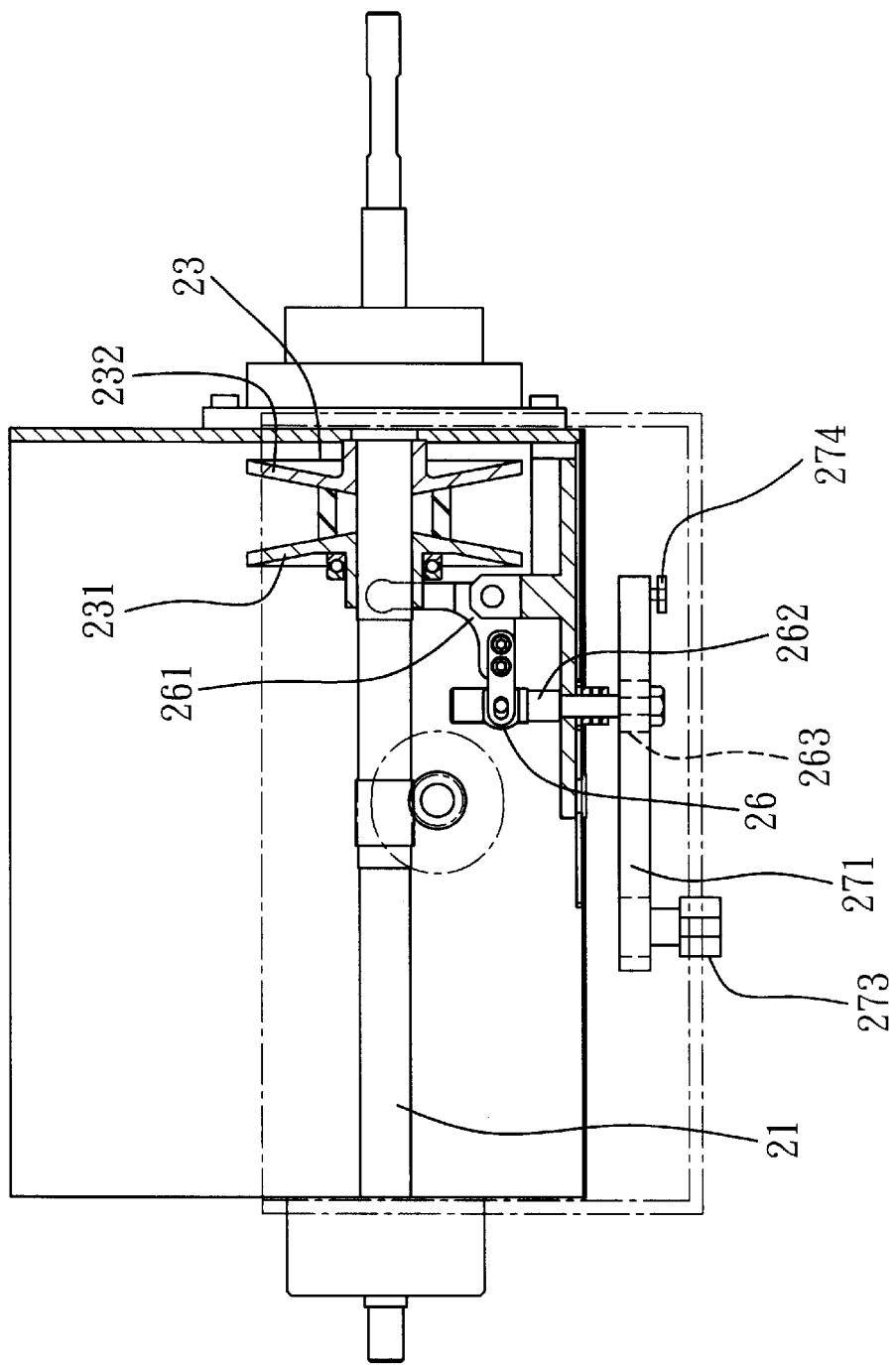
FIG. 8 is a schematic view to illustrate other parts of the motor assembly.

With further reference to FIGS. 8 and 9, the motor assembly 2 further includes a control unit 26, a rack 271, and a pinion 273. The control unit 26 includes an actuating member 261 for moving the movable disc 231 of the first pulley 23 along the transmission shaft 21, an operable member 262 for actuating the actuating member 261, and a gear 263 that is secured to the operable member 262. The rack 271 meshes with the gear 263. The pinion 273 meshes with the rack 271 and is accessible from one side of the base frame 11. As such, turning of the pinion 273 results in linear movement of the rack 271 and in subsequent turning of the gear 263 so as to enable the operable member 262 to actuate the actuating member 261. Therefore, as described above, the movable disc 231 can be moved toward and away from the fixed disc 232 to result in corresponding relative movement between the discs 241, 242 of the second pulley 24 to vary the rotational speed of the transmission shaft 21.

In addition, the base frame 11 is marked with graduations adjacent to the rack 271. A pointer 274 is fixed on the rack 271 and is movable therewith. The graduations and the pointer 274 cooperate to form a speed indicator for indicating the rotational speed of the transmission shaft 21.

In operation, when the motor 22 is activated, the output shaft 221 rotates. At this time, the rotation of the output shaft 221 is transmitted to the transmission shaft 21 and the impeller shaft 32 via the first and second belt transmission means 25, 36. This results in rotation of the first, second and third rotary woodworking members 13, 12, 14, and the blower impeller 33. The construction as such provides the operator with an option to select among the rotary woodworking members 13, 12, 14 to suit different woodworking requirements.

Moreover, since the first, second and third dust collecting units 7, 5, 6, the dust accommodating unit 4, the blower casing 31, and the air conduit 8 are in fluid communication with each other, the blower impeller 33 can draw air from the first, second and third dust collecting units 7, 5, 6 into the dust accommodating unit 4 and finally into the impeller accommodating space and out of the second port 314.

Figure 4:
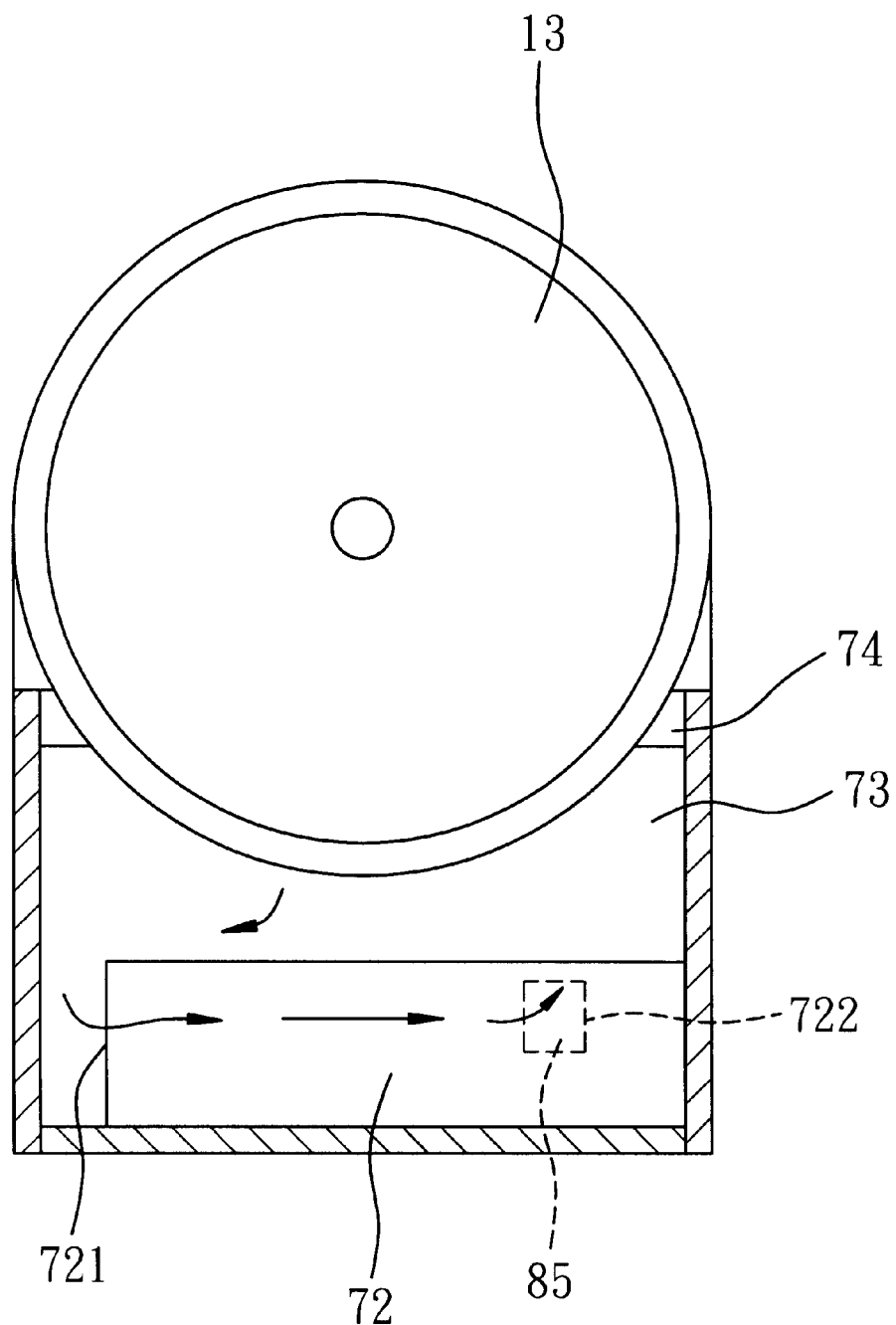
FIG. 4 is a schematic view to illustrate how wood dust generated during operation of a first rotary woodworking member is drawn into a first dust collecting unit.

Particularly, as shown in FIGS. 3 and 4, the wood dust generated during operation of the first rotary woodworking member 13 is directed into the first dust guideway 73 through the inlet port 74 of the first dust guideway 73. The wood dust is then drawn into the air duct 72 through the first opening 721, subsequently into the second accommodation chamber 411 through the first and third passageways 82, 83 of the flow channel, further through the impeller accommodating space, and finally out of the second port 314.

Figure 5:
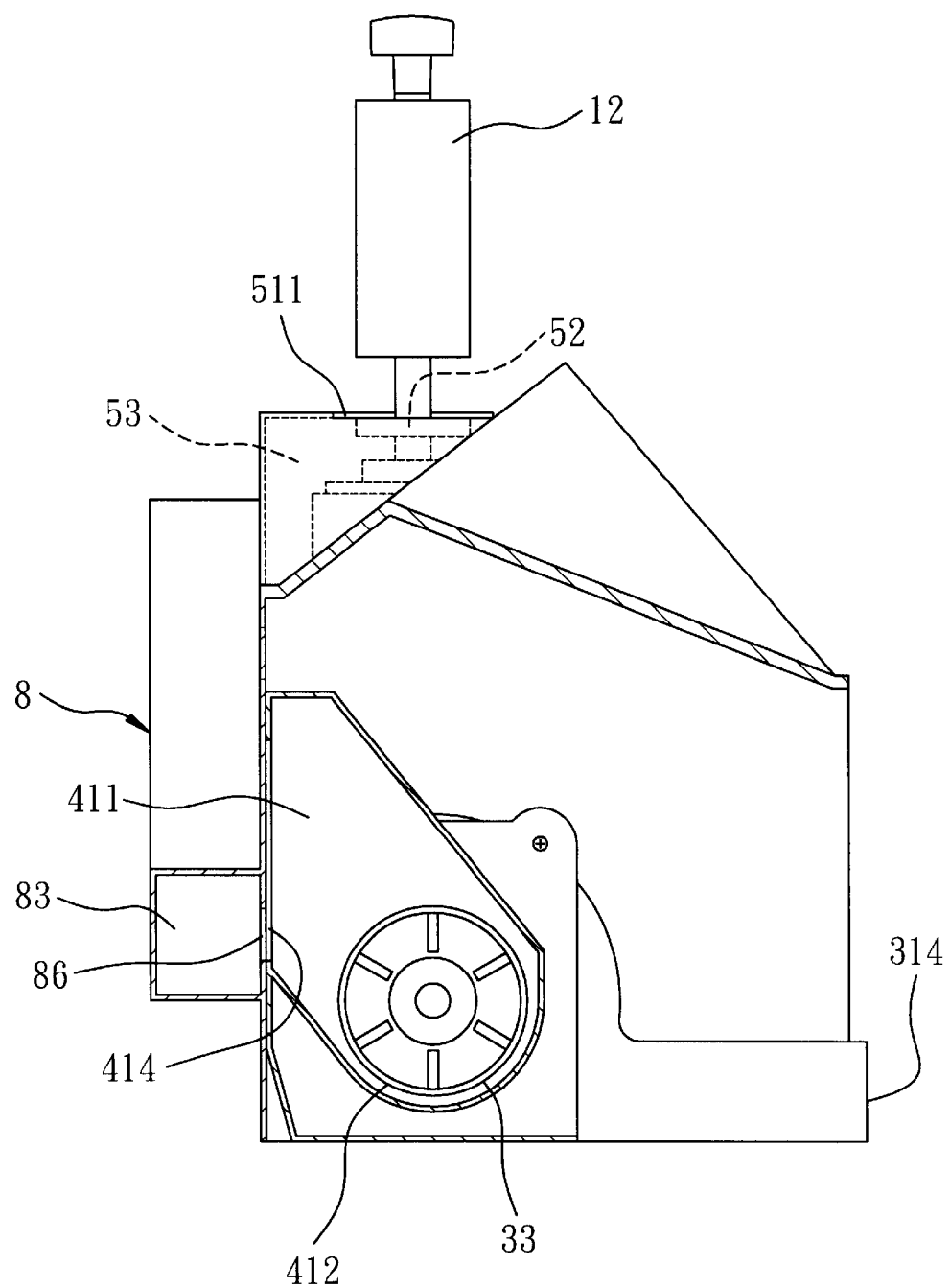
FIG. 5 is a schematic view to illustrate how wood dust generated during operation of a second rotary woodworking member is drawn into a second dust collecting unit.

As shown in FIGS. 3 and 5, the impeller 52 draws the wood dust generated during operation of the second rotary woodworking member 12 into the second dust guideway 53 through the inlet port 511 of the second dust guideway 53. The wood dust is then drawn into the second accommodation chamber 411 through the second and third passageways 81, 83 of the flow channel, subsequently into the impeller accommodating space, and finally out of the second port 314.

Figure 6:
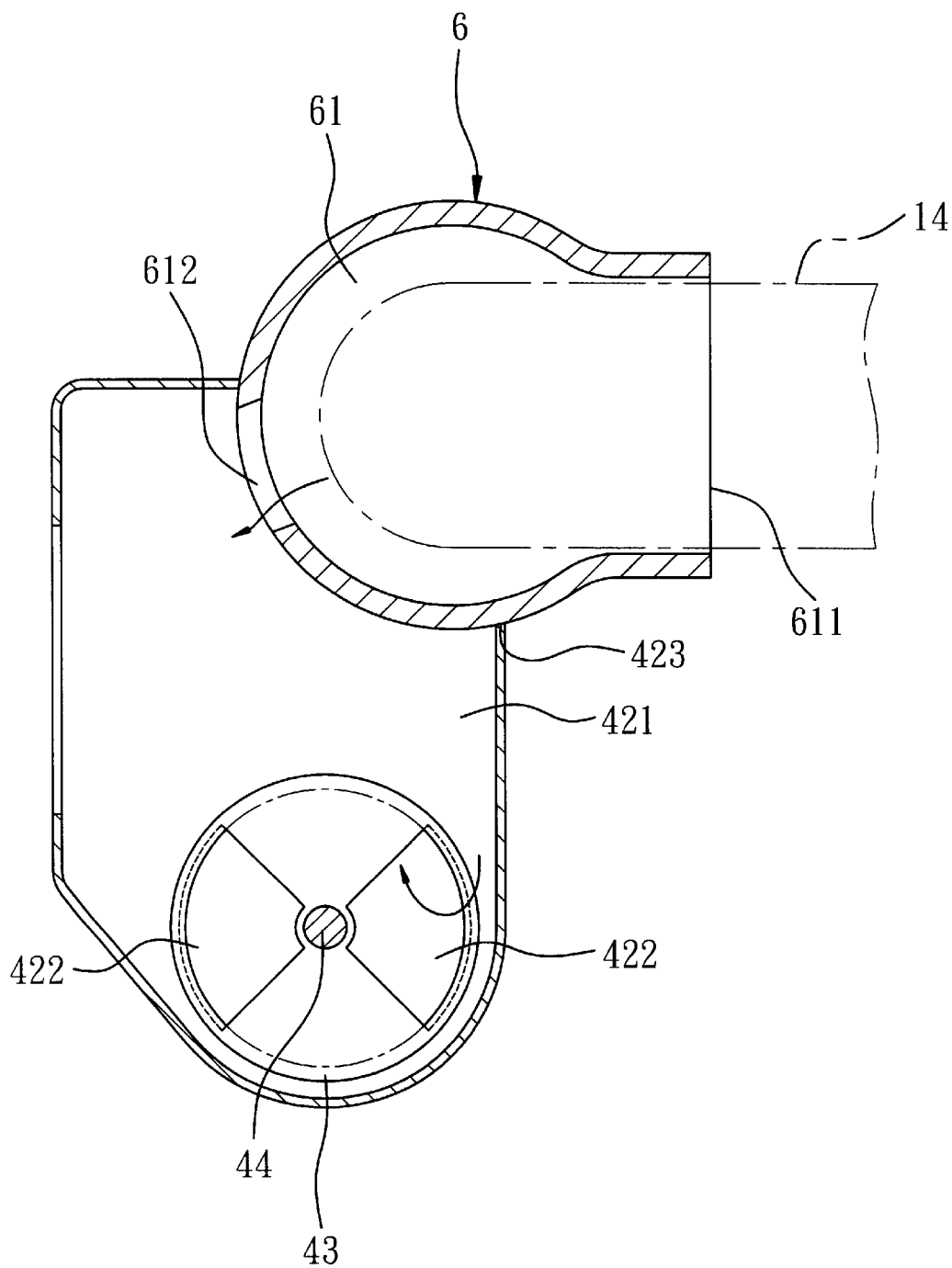
FIG. 6 is a schematic view to illustrate how wood dust generated during operation of a third rotary woodworking member is drawn into a third dust collecting unit.
Figure 7:
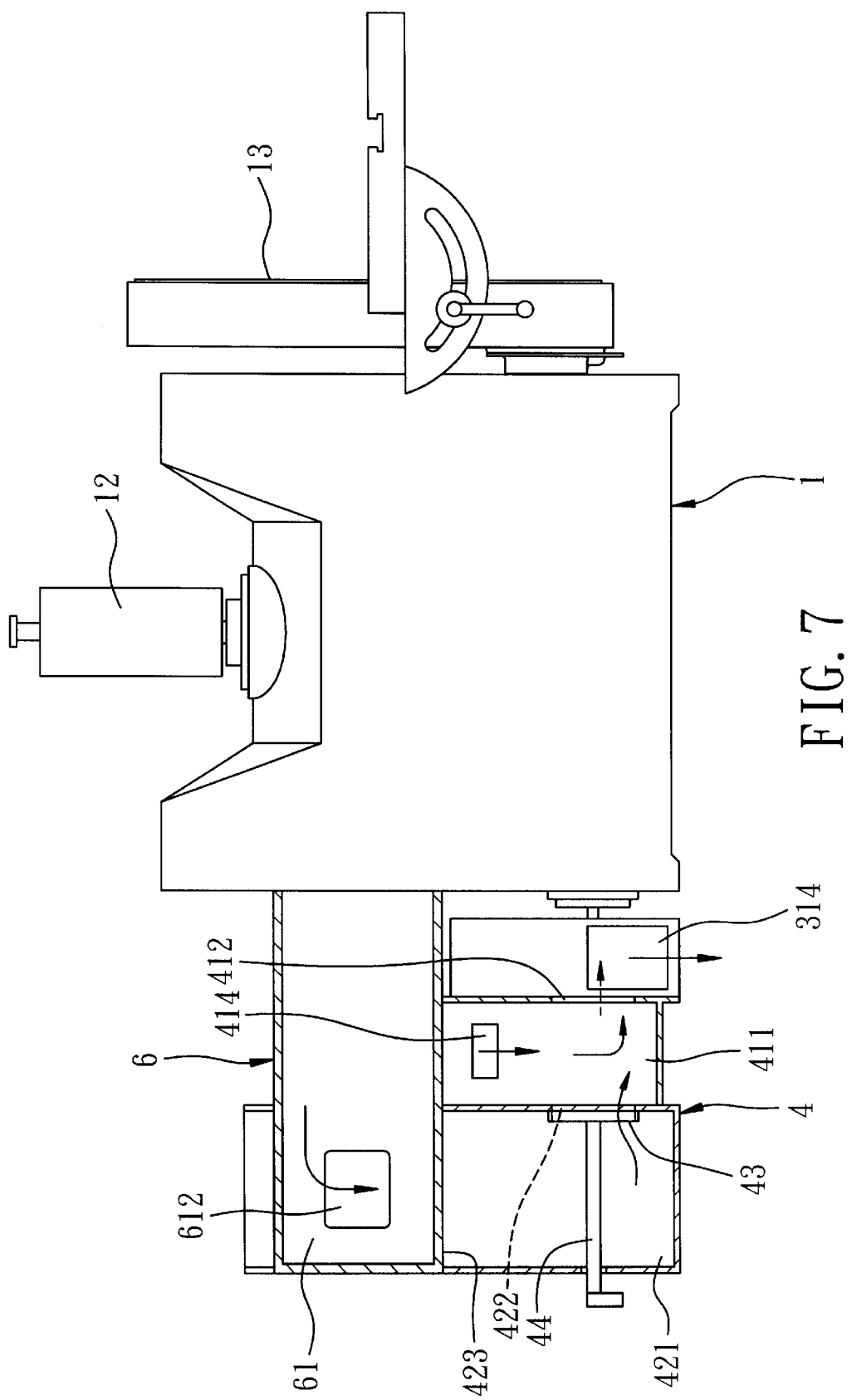
FIG. 7 is a schematic view to illustrate how wood dust generated during operation of the first, second and third dust collecting units is drawn into a dust accommodating unit.

As shown in FIGS. 3, 6, and 7, the wood dust generated during the operation of the third rotary woodworking member 14 is directed into the third dust guideway 61 through the inlet port 611 of the third dust guideway 61. The wood dust is then drawn into the first accommodation chamber 421, subsequently into the second accommodation chamber 411 through the communicating holes 422, further through the impeller accommodating space, and finally out of the second port 314. At this time, the crank 44 can be used to rotate the valve 43 so as to control the amount of the wood dust being drawn from the first accommodation chamber 421 to the second accommodation chamber 411.

Further, a bag (not shown) can be connected to the second port 314 in a known manner so as to contain the wood dust. As such, the wood dust is prevented from scattering in all directions, thereby overcoming the aforesaid drawbacks associated with the prior art.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A rotary woodworking machine comprising:
   a base frame having first and second lateral sides and a top side;
   a first rotary woodworking member disposed adjacent to said first lateral side of said base frame;
   a second rotary woodworking member disposed above said top side of said base frame;
   a third rotary woodworking member disposed adjacent to said second lateral side of said base frame;
   a motor assembly mounted in said base frame and coupled to and driving rotatably said first, second and third rotary woodworking members; and a dust collecting mechanism including
- a first dust collecting unit for collecting wood dust generated during a woodworking operation of said first rotary woodworking member, said first dust collecting unit confining a first dust guideway, said first dust guideway having an inlet port which is disposed in the vicinity of said first rotary woodworking member, said first dust guideway being formed with an air duct therein, said air duct having a first opening which is disposed downstream of said inlet port of said first dust guideway and which is in spatial communication therewith, said air duct further having a second opening which is disposed downstream of said first opening,
- an air conduit confining a flow channel which is connected to and which is in fluid communication with said second opening,
- a second dust collecting unit for collecting wood dust generated during a woodworking operation of said second rotary woodworking member, said second dust collecting unit confining a second dust guideway, said second dust guideway having an inlet port which is disposed in the vicinity of said second rotary woodworking member, and an outlet port which is disposed down stream of said inlet port of said second dust guideway and which is connected to and which is in fluid communication with said air conduit,
- a third dust collecting unit for collecting wood dust generated during a woodworking operation of said third rotary woodworking member, said third dust collecting unit confining a third dust guideway, said third dust guideway having an inlet port which is disposed in the vicinity of said third rotary woodworking member, and an outlet port which is disposed downstream of said inlet port of said third dust guideway,
- a dust accommodating unit for receiving the wood dust from said first, second and third dust guideways, said dust accommodating unit being formed with a partition wall to partition said dust accommodating unit into first and second accommodation chambers, said partition wall being formed with a communicating hole to permit fluid communication between said first and second accommodation chambers, said first accommodation chamber having a first entrance port which is connected to and which is in fluid communication with said outlet port of said third dust guideway, said second accommodation chamber having a second entrance port which is connected to and which is in fluid communication with said flow channel of said air conduit, said second accommodation chamber further having an exit port,
- a blower casing confining an impeller accommodating space and formed with a first port which is connected to and which is in fluid communication with said exit port, and a second port, and
- a blower impeller disposed in said impeller accommodating space and operable so as to draw the wood dust in said second accommodation chamber of said dust accommodating unit into said impeller accommodating space through said first port and out of said second port.

2. The rotary woodworking machine as claimed in claim 1, wherein said dust accommodating unit further includes
- a mounting wall that cooperates with said partition wall to confine said first accommodation chamber,
- a crank extending rotatably through said mounting wall, and having an inner end disposed in said first accommodation chamber, and an outer end disposed externally of said first accommodation chamber, and
- a valve which is mounted on and which is rotated with said inner end so that said valve covers and uncovers said communicating hole by an extent corresponding to rotary displacement of said crank.

3. The rotary woodworking machine as claimed in claim 1, wherein said flow channel of said air conduit includes a first passageway which has a first open port connected to and in fluid communication with said second opening of said air duct in said first dust guideway, a second passageway which has a second open port connected to and in fluid communication with said outlet port of said second dust guideway, and a third passageway which is connected to and which is in fluid communication with said first and second passageways, and which has a third open port connected to and in fluid communication with said second entrance port of said second accommodation chamber.

4. The rotary woodworking machine as claimed in claim 1, wherein said motor assembly includes
- a motor with an output shaft,
- a transmission shaft parallel to said output shaft, and having opposite ends coupled respectively to said first and third rotary woodworking members,
- first belt transmission means for transmitting rotation of said output shaft to said transmission shaft,
- an upright shaft having a lower end coupled to said transmission shaft so as to be driven rotatably thereby, and an upper end coupled to said second rotary woodworking member, and
- second belt transmission means for transmitting rotation of said output shaft to said blower impeller.

5. The rotary woodworking machine as claimed in claim 4, further comprising an impeller secured to said second rotary woodworking member and operable so as to draw the wood dust generated during the woodworking operation of said second rotary woodworking member into said inlet port of said second dust guideway.

6. The rotary woodworking machine as claimed in claim 4, wherein said first rotary woodworking member includes an emery wheel, said second rotary woodworking member includes a sanding drum, and said third rotary woodworking member includes a sanding belt device.

* * * * *